US012132282B2

(12) United States Patent
Wang et al.

(10) Patent No.: US 12,132,282 B2
(45) Date of Patent: Oct. 29, 2024

(54) PCIE/SAS FEMALE ELECTRICAL CONNECTOR

(71) Applicant: Amphenol East Asia Electronic Technology (Shenzhen) Co., Ltd., Shenzhen (CN)

(72) Inventors: Xiang Wang, Shenzhen (CN); Yan-Bin Tan, Shenzhen (CN); Lei Liao, Shenzhen (CN); Wei Luo, Shenzhen (CN)

(73) Assignee: Amphenol East Asia Electronic Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 18/076,066

(22) Filed: Dec. 6, 2022

(65) Prior Publication Data

US 2023/0122686 A1 Apr. 20, 2023

Related U.S. Application Data

(63) Continuation of application No. 17/204,484, filed on Mar. 17, 2021, now Pat. No. 11,581,687.

(51) Int. Cl.
*H01R 13/6591* (2011.01)
*H01R 12/77* (2011.01)
(Continued)

(52) U.S. Cl.
CPC ....... *H01R 13/6591* (2013.01); *H01R 12/775* (2013.01); *H01R 13/05* (2013.01);
(Continued)

(58) Field of Classification Search
CPC .. H01R 13/6591; H01R 12/775; H01R 13/05; H01R 13/10; H01R 13/646;
(Continued)

(56) References Cited

U.S. PATENT DOCUMENTS 7,335,063 B2 2/2008 Cohen et al.
7,581,990 B2 9/2009 Kirk et al.
(Continued)

FOREIGN PATENT DOCUMENTS

CN 2840353 Y * 11/2006
CN 202585857 U 12/2012
(Continued)

OTHER PUBLICATIONS

SFF Committee, SFF-8639, May 26, 2017, SNIA, Rev 2.1, all pages (Year: 2017).*
(Continued)

*Primary Examiner* — Justin M Kratt
(74) *Attorney, Agent, or Firm* — Wolf, Greenfield & Sacks, P.C.

(57) ABSTRACT

A Peripheral Component Interconnect Express/Serial Attached SCSI (PSAS) female connector includes a frame member, a terminal member, and a cover member; the frame member including a terminal groove disposed in the frame member and a tilt portion disposed in the terminal groove adjacent to a plug end; the terminal member inserted in the frame member and including a Serial Advanced Technology Attachment (SATA) 7 pin terminal, a Serial Attached SCSI (SAS) 40 pin terminal, a 15 Pin signal terminal, a 6 Pin terminal, and a 4 Pin terminal. When the PSAS female connector is engaged with the male connector, the SATA 7 Pin terminal and the SAS 40 Pin terminal are pressed by a terminal of the male connector to be bent toward an outer lateral side of the terminal groove to contact the elastic plate of the cover member. The present invention effectively improves the cross interference during high speed transmission, thereby achieving the Generation 5 performance requirement.

21 Claims, 2 Drawing Sheets

(51) Int. Cl.

| | |
|---|---|
| ***H01R 13/05*** | (2006.01) |
| ***H01R 13/10*** | (2006.01) |
| ***H01R 13/646*** | (2011.01) |
| ***H01R 13/6461*** | (2011.01) |
| ***H01R 13/6585*** | (2011.01) |
| ***H01R 13/6598*** | (2011.01) |
| *H01R 12/72* | (2011.01) |
| *H01R 13/02* | (2006.01) |
| *H01R 13/04* | (2006.01) |
| *H01R 13/60* | (2006.01) |
| *H01R 13/62* | (2006.01) |
| *H01R 13/6464* | (2011.01) |
| *H01R 13/648* | (2006.01) |
| *H01R 13/6581* | (2011.01) |
| *H01R 13/6582* | (2011.01) |
| *H01R 13/6583* | (2011.01) |
| *H01R 13/6599* | (2011.01) |
| *H01R 107/00* | (2006.01) |

(52) U.S. Cl.

CPC ........... *H01R 13/10* (2013.01); *H01R 13/646* (2013.01); *H01R 13/6461* (2013.01); *H01R 13/6585* (2013.01); *H01R 13/6598* (2013.01); *H01R 12/727* (2013.01); *H01R 12/77* (2013.01); *H01R 12/777* (2013.01); *H01R 12/778* (2013.01); *H01R 13/02* (2013.01); *H01R 13/04* (2013.01); *H01R 13/60* (2013.01); *H01R 13/62* (2013.01); *H01R 13/6464* (2013.01); *H01R 13/648* (2013.01); *H01R 13/6581* (2013.01); *H01R 13/6582* (2013.01); *H01R 13/6583* (2013.01); *H01R 13/6599* (2013.01); *H01R 2107/00* (2013.01)

(58) Field of Classification Search

CPC ............ H01R 13/6461; H01R 13/6585; H01R 13/6598; H01R 12/727; H01R 12/77; H01R 12/777; H01R 12/778; H01R 13/02; H01R 13/04; H01R 13/60; H01R 13/62; H01R 13/6464; H01R 13/648; H01R 13/6581; H01R 13/6582; H01R 13/6583; H01R 13/6599; H01R 2107/00

See application file for complete search history.

(56) References Cited

U.S. PATENT DOCUMENTS

| | | | | |
|---|---|---|---|---|
| 8,462,502 | B2 | 6/2013 | Hirano et al. | |
| 8,585,440 | B2 | 11/2013 | Jiang et al. | |
| 8,702,451 | B2 | 4/2014 | Luo et al. | |
| 8,740,631 | B2 | 6/2014 | Chen | |
| 9,225,090 | B2 | 12/2015 | Chen | |
| 9,407,022 | B1 | 8/2016 | Wang | |
| 9,564,714 | B1 | 2/2017 | Wang et al. | |
| 9,941,641 | B1 * | 4/2018 | Jiang | H01R 13/6599 |
| 9,985,391 | B1 | 5/2018 | Wang | |
| 10,283,910 | B1 * | 5/2019 | Chen | H01R 4/04 |
| 10,411,376 | B1 | 9/2019 | Wang et al. | |
| 10,651,589 | B1 | 5/2020 | Wang et al. | |
| 10,763,608 | B1 | 9/2020 | Wang et al. | |
| 11,251,554 | B1 | 2/2022 | Tan et al. | |
| 11,581,687 | B2 | 2/2023 | Wang et al. | |
| 2014/0004744 | A1 * | 1/2014 | Hsu | H01R 13/658 439/626 |
| 2014/0211389 | A1 | 7/2014 | Zhou et al. | |
| 2018/0090887 | A1 * | 3/2018 | Little | H01R 13/6594 |
| 2018/0205181 | A1 | 7/2018 | Chen et al. | |
| 2019/0214753 | A1 | 7/2019 | Jiang et al. | |
| 2020/0028289 | A1 | 1/2020 | Dai et al. | |
| 2021/0044060 | A1 * | 2/2021 | Wu | H01R 12/57 |
| 2021/0399455 | A1 | 12/2021 | Wang et al. | |
| 2022/0077614 | A1 | 3/2022 | Tan et al. | |
| 2022/0302655 | A1 | 9/2022 | Wang et al. | |
| 2022/0360000 | A1 | 11/2022 | Tan et al. | |
| 2023/0047671 | A1 | 2/2023 | Wang et al. | |
| 2023/0050934 | A1 | 2/2023 | Yin et al. | |

FOREIGN PATENT DOCUMENTS

| | | | |
|---|---|---|---|
| CN | 203205638 | U | 9/2013 |
| CN | 203850501 | U | 9/2014 |
| CN | 104283080 | A | 1/2015 |
| CN | 204376132 | U | 6/2015 |
| CN | 205016785 | U | 2/2016 |
| CN | 103887641 | B | 6/2016 |
| CN | 205944534 | U | 2/2017 |
| CN | 206962152 | U | 2/2018 |
| CN | 207116835 | U | 3/2018 |
| CN | 207517943 | U | 6/2018 |
| CN | 109004437 | A | 12/2018 |
| CN | 208284706 | U | 12/2018 |
| CN | 208433570 | U | 1/2019 |
| CN | 209675519 | U | 11/2019 |
| CN | 212380677 | U | 1/2021 |
| CN | 215816686 | U | 2/2022 |
| TW | I505580 | B | 10/2015 |
| TW | I509921 | B | 11/2015 |
| TW | M546036 | U | 7/2017 |
| TW | M563682 | U | 7/2018 |
| TW | M573906 | U | 2/2019 |
| TW | M584561 | U | 10/2019 |
| TW | M606366 | U | 1/2021 |
| TW | M618868 | U | 11/2021 |
| TW | M621514 | U | 12/2021 |

OTHER PUBLICATIONS

[No Author Listed], SFF Committee SFF-8639 Specification for Multifunction 6X Unshielded Connector. Rev 2.1. Development. SNIA SFF TWG Technology Affiliate. May 26, 2017. 32 pages.

[No Author Listed], SFF-TA-1001 Specification for Universal x4 Link Definition for SFF-8639. Rev 1.1. SNIA Advance storage & information technology. May 28, 2018. 20 pages.

Cao et al., High Speed Electrical Connector, U.S. Appl. No. 18/097,778, filed Jan. 17, 2023.

Cao et al., High Speed Electrical Connector, U.S. Appl. No. 18/097,805, filed Jan. 17, 2023.

Mason et al., SAS Standards and Technology Update. Storage Developer Conference (SDC). 2011. 46 pages. URL:https://www.snia.org/sites/default/orig/SDC2011/presentations/monday/HarryMason_SAS% 20_Standards_Technology_Updater1.pdf [last accessed Jun. 2, 2022].

Tan et al., PSAS 5.0 Female Connector, U.S. Appl. No. 18/084,454, filed Dec. 19, 2022.

Yin et all., High Speed Plug Connector, U.S. Appl. No. 17/848,851, filed Jun. 24, 2022.

* cited by examiner

PCIE/SAS FEMALE ELECTRICAL CONNECTOR

RELATED APPLICATIONS

This application is a continuation of U.S. patent application Ser. No. 17/204,484, now U.S. Pat. No. 11,581,687, filed Mar. 17, 2021, and entitled "PCIE/SAS FEMALE ELECTRICAL CONNECTOR" which is hereby incorporated herein by reference in its entirety.

TECHNICAL FIELD

The present invention relates to filed of connectors, and more particularly, to a Peripheral Component Interconnect Express/Serial Attached SCSI (PSAS) female connector.

BACKGROUND

In the server storage industry, as the data storage requirement increases continuously, the transmission rate requirement accordingly increases as well. With the increasing of clock rate and the dramatic time shortening of the increasing of clock rate, the transmission rate requirement upon the connector becomes higher than before. Due to a relatively complicated structure, the signal terminal of the PSAS female connector comprises two bending arrangements, wherein the routes of the inner and outer row thereof are longer and closer to each other. Therefore, it is desired to resolve the cross interference under a high data transmission rate, so as to realize a 32 Gbps transmission rate under the U.2 and U.3 applications.

BRIEF SUMMARY

For resolving the issues above, a PSAS female connector is disclosed. With a structural improvement, the cross interference issues in the high speed data transmission of the female connector is avoided.

For achieving the aforementioned objectives, a PSAS female connector is provided, comprising a frame member, a terminal member, and a cover member; the frame member comprising a terminal groove and a tilt portion; the terminal groove disposed in the frame member; the tilt portion disposed in the terminal groove adjacent to a plug end; the terminal member inserted in the frame member and comprising a Serial Advanced Technology Attachment (SATA) 7 pin terminal, a Serial Attached SCSI (SAS) 40 pin terminal, a 15 Pin signal terminal, a 6 Pin terminal, and a 4 Pin terminal; the cover member comprising a shorter cover plate and a longer cover plate; the shorter cover plate and the longer cover plate comprising an elastic plate disposed on an end portion of the shorter cover plate and the longer cover plate; the cover member formed in a plate shape, the shorter cover plate and the longer cover plate disposed on a lateral side of the frame member inserted with the SATA 7 Pin terminal and a lateral side of the frame member inserted with the SAS 40 Pin terminal, respectively; before the PSAS female connector being engaged with a male connector, a pin of the SATA 7 Pin terminal and a pin of the SAS 40 Pin terminal abutting against the tilt portion, a contact point of the pin of the SATA 7 Pin terminal and the tilt portion being positioned on a same plane with a contact point of the pin of the SAS 40 Pin terminal and the tilt portion; when the PSAS female connector is engaged with the male connector, the SATA 7 Pin terminal and the SAS 40 Pin terminal are pressed by a terminal of the male connector to be bent toward an outer lateral side of the terminal groove to contact the elastic plate of the cover member; through a contact with the elastic plate of the cover member, the pin of the SATA 7 Pin terminal are connected with the pin of the SAS 40 Pin terminal.

Preferably, the frame member of the PSAS female connector is formed of a plastic material.

Preferably, the frame member of the PSAS female connector comprises a conductive plastic; the conductive plastic comprises a shorter conductive plastic portion and a longer conductive plastic portion both disposed in the terminal groove; the shorter cover plate and the longer cover plate are connected with the shorter conductive plastic portion and longer conductive plastic portion, respectively.

The PSAS female connector comprises a positioner; the frame member comprises a position hole formed on two sides of the frame member; an end of the positioner passes through the position hole to be fixed on a PCB. With such configuration, the present invention achieves the following advantages.

Compared with prior arts, the two cover plates in the present invention have an elastic plate on the end portion thereof, and the elastic plates are attached to the frame member corresponding to the insertion positions of the SATA7 Pin and SAS 40 Pin signal power source terminals, respectively. The pins of the SATA 7 Pin terminal and SAS 40 Pin terminal abut against the tilt portion, wherein the contact point of the pin of the SATA 7 Pin terminal and the tilt portion are positioned on a same plane with the contact point of the pin of the SAS 40 Pin terminal and the tilt portion, so as to prevent the pins from being positioned at different heights. During operation, after the PSAS female connector is engaged with the male connector, the SATA 7 Pin terminal and the SAS 40 Pin terminal are pressed by the terminal of the male connector to be bent toward an outer lateral side of the terminal groove to contact the elastic plate of the cover member. Through contact with the elastic plate of the cover member, the pin of the SATA 7 Pin terminal is connected with the pin of the SAS 40 Pin terminal. The cover member contacted with the conductive plastic, facilitating the connection between the head end and the tail end of the grounding terminal, thereby providing an optimal cover and improving the cross interference, achieving a Generation 5 (Gen5) performance requirement.

DETAILED DESCRIPTION

Figure 1:
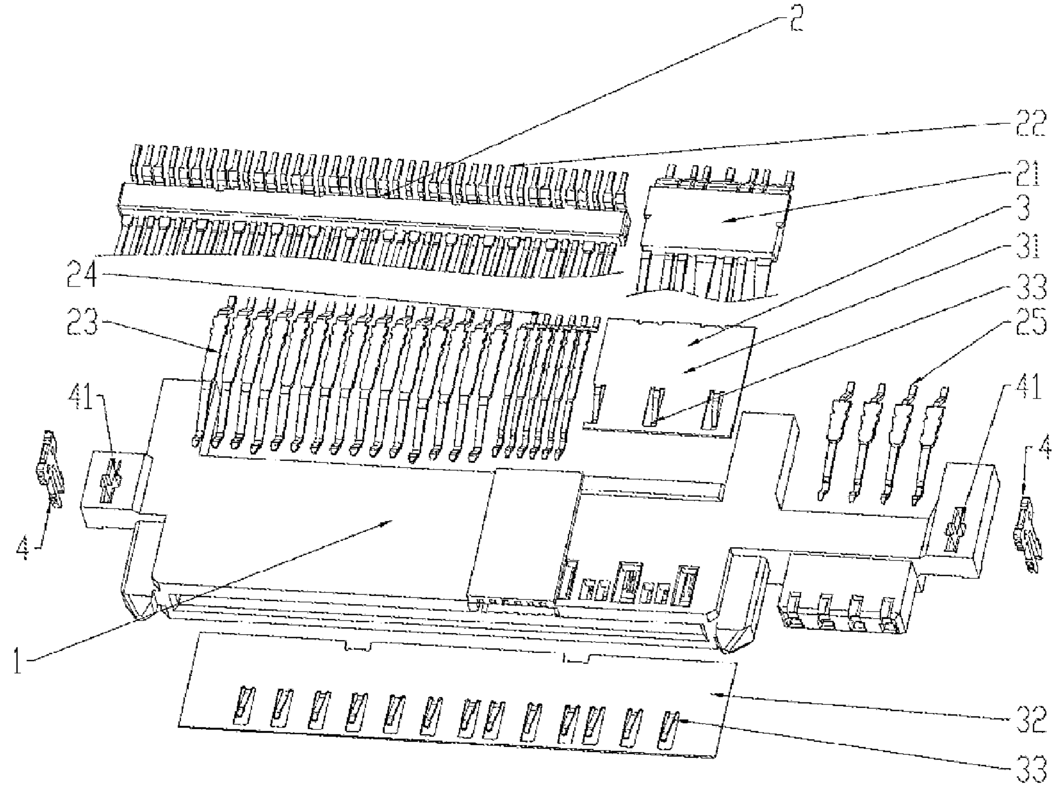
FIG. 1 is an exploded view of the PSAS female connector in accordance with an embodiment of the present invention.
Figure 2:
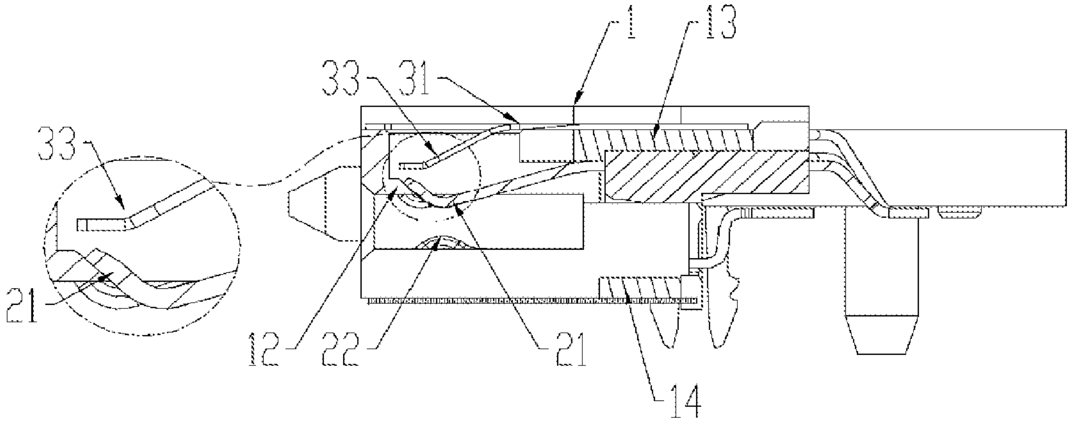
FIG. 2 is a partially enlarged sectional side view of the PSAS female connector, illustrating the terminal pin abutting against the tilt portion before engagement.
Figure 3:
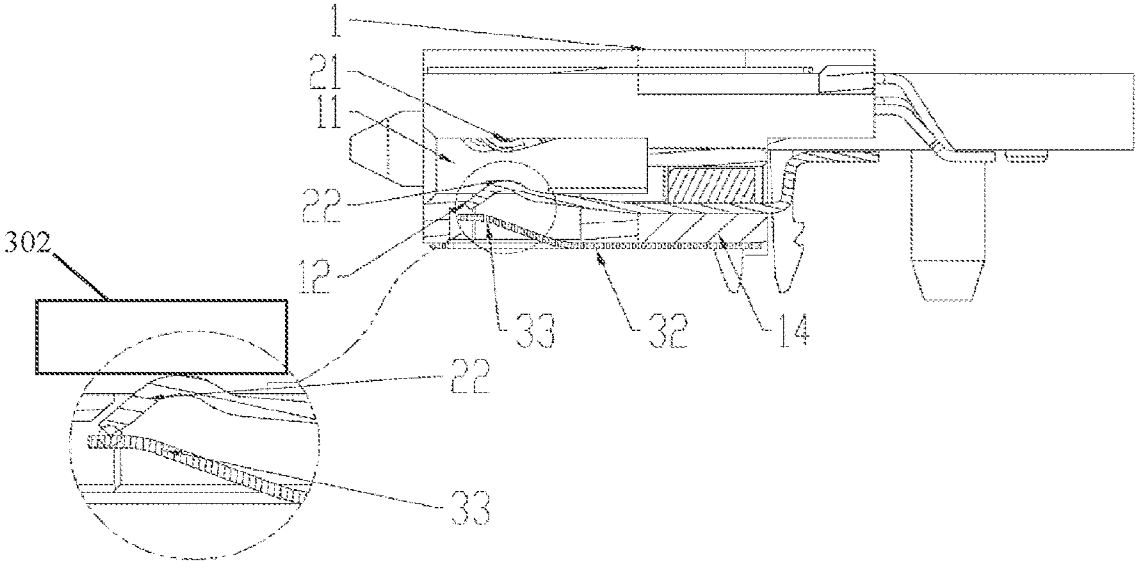
FIG. 3 is a partially enlarged sectional side view of the PSAS female connector, illustrating the terminal pin contacting the elastic plate.

The aforementioned and further advantages and features of the present invention will be understood by reference to the description of the preferred embodiment in conjunction with the accompanying FIG. 1 to FIG. 3 where the components are illustrated based on a proportion for explanation but not subject to the actual component proportion.

Embodiment 1

Referring to FIG. 1, the PSAS female connector comprises a frame member 1, a terminal member 2, and a cover member 3.

The frame member 1 comprises a terminal groove 11 and a tilt portion 12.

The terminal groove 11 is disposed in the frame member 1.

The tilt portion 12 is disposed in the terminal groove 11 adjacent to a plug end. As shown in FIGS. 2 and 3, the tilt portion 12 is shaped as a shelf.

The terminal member 2 is inserted in the frame member 1 and comprises a SATA 7 Pin terminal 21, an SAS 40 Pin terminal 22, a 15 Pin signal terminal 23, a 6 Pin terminal 24, and a 4 Pin terminal 25.

The cover member 3 comprises a shorter cover plate 31 and a longer cover plate 32. As shown in FIG. 1, the shorter cover plate 31 is shorter than the longer cover plate 32. Both the shorter cover plate 31 and the longer cover plate 32 comprises an elastic plate 33 disposed on an end portion of the shorter cover plate 31 and the longer cover plate 32. As shown in FIG. 1, the elastic plate 33 of the shorter cover plate 31 includes a first plurality of contact members; and the elastic plate 33 of the longer cover plate 32 includes a second plurality of contact members.

The cover member 3 is formed in a plate shape. The shorter cover plate 31 and the longer cover plate 32 are disposed on a lateral side of the frame member 1 inserted with the SATA 7 Pin terminal 21 and a lateral side of the frame member 1 inserted with the SAS 40 Pin terminal 22, respectively.

Referring to FIG. 2 and FIG. 3, before the PSAS female connector being engaged with a male connector 302, a pin of the SATA 7 Pin terminal 21 and a pin of the SAS 40 Pin terminal 22 abut against the tilt portion 12, wherein a contact point of the pin of the SATA 7 Pin terminal 21 and the tilt portion are positioned on a same plane with a contact point of the pin of the SAS 40 Pin terminal 22 and the tilt portion, thereby preventing the pins from being positioned at different heights. When the PSAS female connector is engaged with the male connector 302, the SATA 7 Pin terminal 21 and the SAS 40 Pin terminal 22 are pressed by a terminal of the male connector to be bent toward an outer lateral side of the terminal groove 11 to contact the elastic plate 33 of the cover member 3. Through the contact with the elastic plate 33 of the cover member 3, the pin of the SATA 7 Pin terminal 21 is connected with the 10 pin of the SAS 40 Pin terminal 22, thereby forming an optimal cover and improving the cross interference, achieving the Gen5 performance requirement.

Embodiment 2

Referring to FIG. 1 to FIG. 3, on the basis of embodiment 1, the frame member of the PSAS female connector is formed of a plastic material. The frame member 1 comprises a conductive plastic. The conductive plastic comprises a shorter conductive plastic portion 13 and a longer conductive plastic portion 14 that are disposed in the terminal groove 11. The shorter cover plate 31 and the longer cover plate 32 are connected with the shorter conductive plastic portion 13 and the longer conductive plastic portion 14, respectively.

The PSAS female connector comprises a positioner 4. The frame member comprises a position hole 41 formed on two sides of the frame member 1. An end of the positioner 4 passes through the position hole 41 to be fixed on a PCB.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electrical connector, comprising:

a frame member comprising a groove;

a plurality of terminals held by the frame member, each of the plurality of terminals comprising a head end disposed in the groove and a tail end extending out of the frame member; and a metal member held by the frame member, the metal member comprising a plurality of contact members electrically connected to each other, wherein:

each contact member of the plurality of contact members comprises a proximal end connected to the metal member and a distal end opposite the proximal end and extending in a same direction as the head end of a respective terminal of the selected ones of the plurality of terminals, each contact member of the plurality of contact members comprises a contact portion, the contact portions of the plurality of contact members are separate from the head ends of the plurality of terminals, and the contact portions of the plurality of contact members are configured to contact the head ends of the respective selected ones of the plurality of terminals when the plurality of terminals are deflected upon insertion of a mating component into the groove.

2. The electrical connector of claim 1, comprising:

conductive plastic disposed in the frame member and coupled to the selected ones of the plurality of terminals at locations closer to the tail ends of the terminals than the head ends of the terminals.

3. The electrical connector of claim 1, wherein:

the plurality of terminals is a first plurality of terminals disposed on a first side of the frame member, and the electrical connector comprises a second plurality of terminals disposed on a second side of the frame member that is separate from the first side by the groove.

4. The electrical connector of claim 3, wherein:

the plurality of contact members are a plurality of first contact members, and the connector comprises a plurality of second contact members each comprising a contact portion, the contact portions of the plurality of second contact members being separate from the head ends of the second plurality of terminals and configured to contact the head ends of selected ones of the second plurality of terminals when the second plurality of terminals are deflected upon insertion of a mating component into the groove.

5. The electrical connector of claim 4, wherein:

each of the first plurality of contact members comprises a first bend; and each of the second plurality of contact members comprises a second bend.

6. The electrical connector of claim 4, wherein:

the second plurality of terminals are configured according to a Serial Attached SCSI (SAS) specification.

7. The electrical connector of claim 6, wherein:

the first plurality of terminals are configured according to a Serial Advanced Technology Attachment (SATA) specification.

8. The electrical connector of claim 4, comprising:

a first region of conductive plastic disposed in the frame member and contacting the selected ones of the first plurality of terminals; and a second region of conductive plastic disposed in the frame member and separate from the first conductive plastic by the groove of the frame member and contacting the selected ones of the second plurality of terminals.

9. The electrical connector of claim 4, wherein:

the selected ones of the first plurality of terminals and the selected ones of the second plurality of terminals are connected.

10. An electrical connector, comprising:

a frame;

a plurality of terminals held by the frame;

a metal member disposed in the frame and coupled to selected ones of the plurality of terminals at a first end, the metal member comprising a plurality of contact members at a second end opposite the first end, and conductive plastic coupled to the metal member and to at least some of the plurality of terminals at the first end of the metal member, wherein the plurality of contact members at the second end of the metal member are disposed corresponding to the selected ones of the plurality of terminals and configured to contact the selected ones of the plurality of terminals.

11. The electrical connector of claim 10, wherein:

the plurality of terminals is a first plurality of terminals, and the electrical connector comprises a second plurality of terminals held by the frame and separate from the metal member by the first plurality of terminals.

12. The electrical connector of claim 11, wherein:

the metal member is a first metal member comprising a plurality of first contact members at the second end of the first metal member, and the electrical connector comprises a second metal member held by the frame and coupled to selected ones of the second plurality of terminals at a third end, the second metal member comprising a plurality of second contact members at a fourth end opposite the third end.

13. The electrical connector of claim 12, wherein:

the plurality of second contact members at the fourth end of the second metal member are disposed corresponding to the selected ones of the second plurality of terminals.

14. The electrical connector of claim 13, comprising:

conductive plastic configured to couple the second metal member to the selected ones of the second plurality of terminals at the third end of the second metal member.

15. An electrical connector comprising:

an insulative member;

a plurality of ground conductors held by the insulative member, each of the plurality of ground conductors comprising a mating portion configured to engage a mating component; and a metal member held by the insulative member, the metal member comprising a plurality of contact members disposed on an end portion of the metal member and electrically connected to each other and separate from the mating portions of the plurality of ground conductors, each of the plurality of contact members comprising a proximal end connected to the metal member and electrically connected to a respective ground conductor at a location closer to the proximal end than a distal end opposite the proximal end, and a contact portion configured to:

engage the mating portion of a respective one of the plurality of ground conductors when the respective one of the plurality of ground conductors engages the mating component; and disengage the mating portion of the respective one of the plurality of ground conductors when the respective one of the plurality of ground conductors disengages the mating component.

16. The electrical connector of claim 15, further comprising:

conductive plastic configured to couple the metal member to selected ones of the plurality of ground conductors.

17. The electrical connector of claim 16, wherein:

the plurality of contact members are disposed corresponding to the selected ones of the plurality of ground conductors such that, upon deflection of the selected ones of the plurality of ground conductors, the selected ones of the plurality of ground conductors contact respective contact members of the plurality of contact members.

18. The electrical connector of claim 15, comprising:

a plurality of signal conductors held by the insulative member, each of the plurality of ground conductors comprising a mating portion configured to engage a mating component, wherein the plurality of ground conductors is disposed between respective ones of the plurality of signal conductors.

19. The electrical connector of claim 15, wherein:

the plurality of ground conductors are a first plurality of ground conductors aligned in a first column;

the plurality of contact members are a first plurality of contact members;

the electrical connector comprises a second plurality of ground conductors aligned in a second column parallel to the first column and a second plurality of contact members;

each of the second plurality of ground conductors comprises a mating portion configured to engage a mating component; and each of the second plurality of contact members comprises a contact portion configured to:

engage a respective one of the second plurality of ground conductors when the respective one of the second plurality of ground conductors engages the mating component; and disengage the respective one of the second plurality of ground conductors when the respective one of the second plurality of ground conductors disengages the mating component.

20. The electrical connector of claim 19, wherein:

the first plurality of contact members are electrically connected to the second plurality of contact members.

21. The electrical connector of claim 20, comprising:

conductive plastic disposed in the insulative member at an end opposite to the mating portions of the plurality of ground conductors, wherein the conductive plastic electrically couples the plurality of contact members to the plurality of ground conductors.

* * * * *